US011371387B2

(12) United States Patent
 Beauquin

(10) Patent No.: US 11,371,387 B2
(45) Date of Patent: Jun. 28, 2022

(54) COOLING DEVICE FOR A TURBINE OF A TURBOMACHINE

(71) Applicant: SAFRAN AIRCRAFT ENGINES, Paris (FR)

(72) Inventor: Nicolas Jean-Marc Marcel Beauquin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 101 days.

(21) Appl. No.: 16/253,842

(22) Filed: Jan. 22, 2019

(65) Prior Publication Data

US 2019/0226357 A1     Jul. 25, 2019

(30) Foreign Application Priority Data

Jan. 22, 2018    (FR) ...................................... 1850473

(51) Int. Cl.
  *F01D 25/14*        (2006.01)
  *F28F 9/013*        (2006.01)
        (Continued)

(52) U.S. Cl.
  CPC ............... *F01D 25/14* (2013.01); *F01D 9/06* (2013.01); *F01D 11/24* (2013.01); *F02C 7/20* (2013.01);
        (Continued)

(58) Field of Classification Search
  CPC ........ F01D 25/14; F01D 25/145; F01D 25/24; F01D 25/243; F01D 25/246; F01D 25/28
        (Continued)

(56) References Cited

U.S. PATENT DOCUMENTS 8,590,285 B2 * 11/2013 Hohmann ............... F23Q 3/006
                                                                60/39.827
2006/0249636 A1 * 11/2006 Thiedig ................. F16L 3/1091
                                                                 248/74.4
(Continued)

FOREIGN PATENT DOCUMENTS

EP         1473499 A1    11/2004
EP         2573277 A1     3/2013
        (Continued)

OTHER PUBLICATIONS

French Application No. 1850473; Preliminary Search Report dated Oct. 11, 2018—9 pgs. (relevance found in the citations therein).

*Primary Examiner* — Woody A Lee, Jr.
*Assistant Examiner* — Justin A Pruitt
(74) *Attorney, Agent, or Firm* — Lathrop GPM LLP

(57) ABSTRACT

The invention concerns a cooling device (21) extending circumferentially around a turbo machine housing, such as a turbine housing, having at least one cooling module (30a, 30b, 30c) comprising a tube holder (31, 32) having at least one plate, preferably a radially inner plate (31) and a radially outer plate (32) fixed to each other, the tube holder (31, 32) defining at least two axially spaced housings (34a), each housing (34a) receiving a tube (23) and a sleeve (38) mounted around each tube (23), each tube (23) extending circumferentially around the housing, each cooling module (30a, 30b, 30c) having first fastening means capable of firmly holding its tube holder (31, 32) with respect to the housing, the fixing means comprising at least one spacer (41) having a radially inner end intended to bear against the housing and a radially outer end bearing on the single or on one of the sheets of the tube support (31, 32).

20 Claims, 3 Drawing Sheets

(51) Int. Cl.
    *F16L 3/10*     (2006.01)
    *F16L 3/22*     (2006.01)
    *F01D 11/24*     (2006.01)
    *F02C 7/20*     (2006.01)
    *F01D 9/06*     (2006.01)

(52) U.S. Cl.
    CPC ........ *F28F 9/0131* (2013.01); *F05D 2240/14* (2013.01); *F05D 2260/20* (2013.01); *F05D 2260/30* (2013.01); *F16L 3/1016* (2013.01); *F16L 3/22* (2013.01)

(58) Field of Classification Search
    USPC ........................................................ 415/175
    See application file for complete search history.

(56) References Cited

U.S. PATENT DOCUMENTS

| | | | |
|---|---|---|---|
| 2008/0149783 A1* | 6/2008 | Michaud | F16L 3/04 |
| | | | 248/74.1 |
| 2014/0030066 A1* | 1/2014 | Schimmels | F01D 25/14 |
| | | | 415/116 |
| 2015/0345328 A1* | 12/2015 | Prestel | F01D 11/24 |
| | | | 415/116 |
| 2016/0003088 A1* | 1/2016 | Cohin | F16L 3/221 |
| | | | 60/806 |
| 2018/0283583 A1* | 10/2018 | Dalisay | H02G 3/263 |

FOREIGN PATENT DOCUMENTS

| | | |
|---|---|---|
| FR | 3021700 | 12/2015 |
| WO | WO 2017/032952 A1 | 3/2017 |

\* cited by examiner

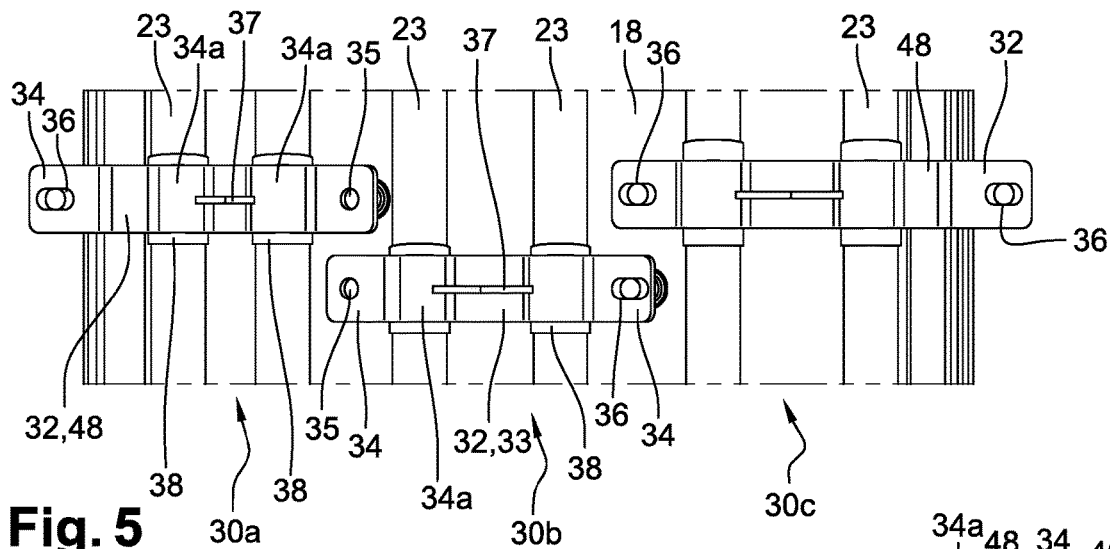
Fig. 5
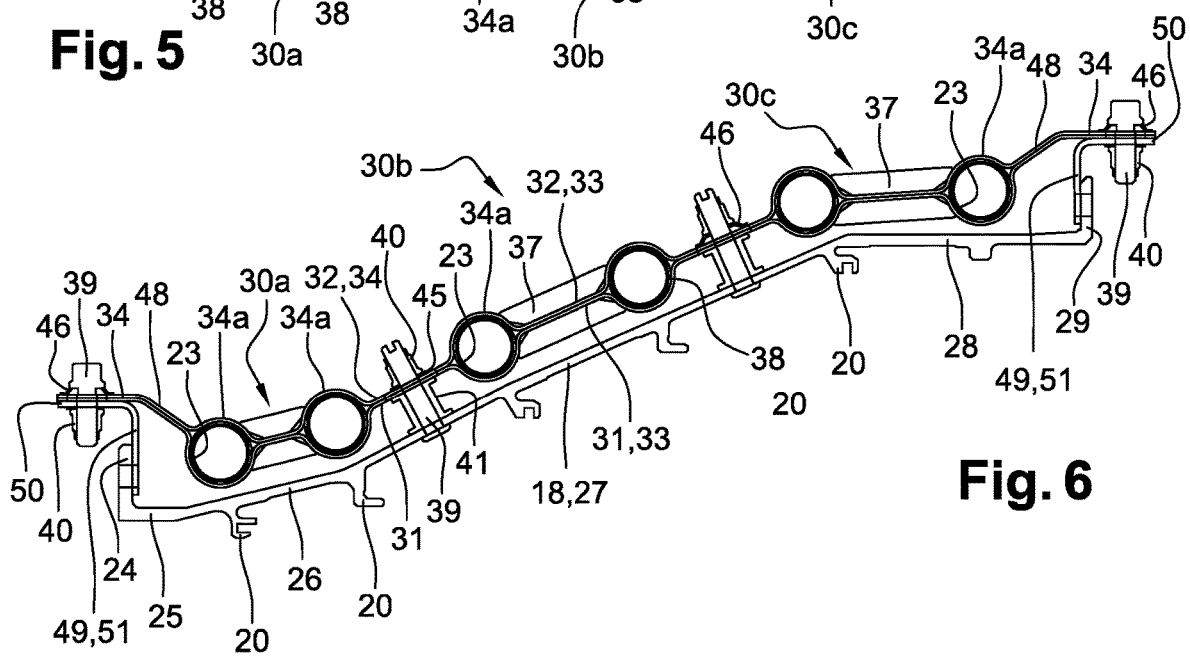
Fig. 6
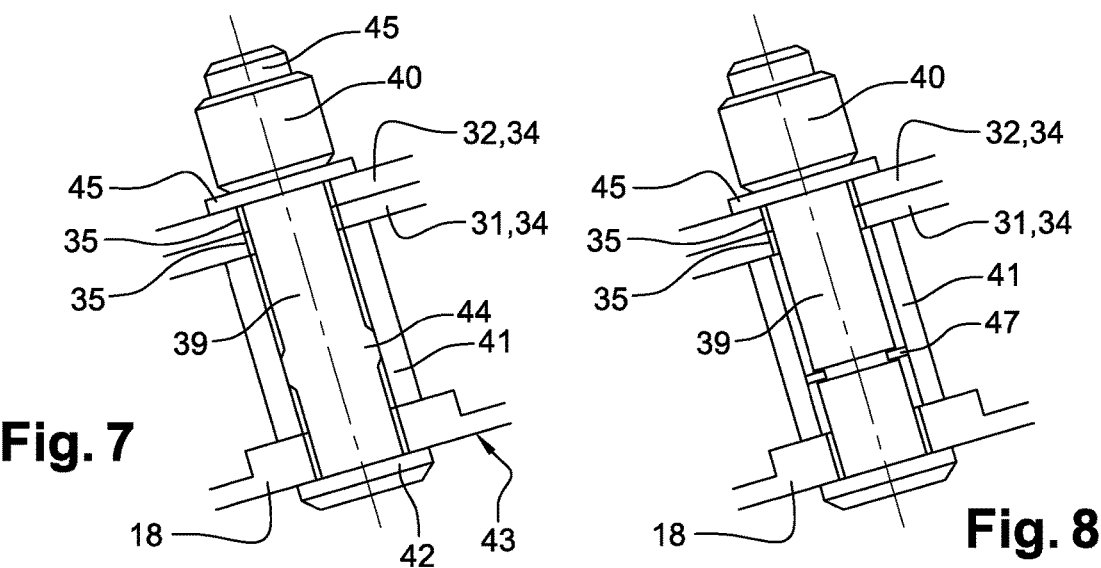
Fig. 7
Fig. 8

COOLING DEVICE FOR A TURBINE OF A TURBOMACHINE

CROSS-REFERENCE TO RELATED APPLICATIONS

This application claims the benefit of priority to French Patent Application No. 1850473, filed Jan. 22, 2018, which is incorporated herein by reference in its entirety.

DOMAIN OF THE INVENTION

This invention concerns a cooling device for a turbine of a turbo machine, such as an aircraft turbojet, in particular a dual-flow turbojet.

BACKGROUND

FIG. 1 shows a turbomachine 1 with double flow and double body. The axis of the turbomachine is referenced X and corresponds to the axis of rotation of the rotating parts. In the following, the terms axial and radial are defined in relation to the X axis.

Turbomachine 1 has, from upstream to downstream in the direction of gas flow, a blower 2, a low-pressure compressor 3, a high-pressure compressor 4, a combustion chamber 5, a high-pressure turbine 6 and a low-pressure turbine 7.

The air from fan 2 is divided into a primary flow 8 flowing into a primary annular vein 9, and a secondary flow 10 flowing into a secondary annular vein 11 surrounding the primary annular vein 10.

The low-pressure compressor 3, high-pressure compressor 4, combustion chamber 5, high-pressure turbine 6 and low-pressure turbine 7 are located in primary vein 9.

The rotor of the high-pressure turbine 6 and the rotor of the high pressure compressor 4 are coupled in rotation via a first shaft 12 in order to form a high pressure body.

The rotor of the low-pressure turbine 7 and the rotor of the low-pressure compressor 3 are coupled in rotation via a second shaft 13 in order to form a low-pressure body, the blower 2 being able to be connected directly to the rotor of the low-pressure compressor 3 or via an epicyclic gear train for example.

As is best seen in FIG. 2, the low-pressure turbine 7 has in particular different successive stages with moving wheels 14 and fixed parts. The impeller has a disc 15 on which blades 16 are mounted. The ends of the blades 16 are surrounded by a fixed ring 17 made of abradable material, said ring 17 being fixed on the turbine housing 18. Valves 19 are located downstream of the impellers 14. Valves 19 and rings 17 are mounted on the housing by means of flanges or hooks 20 extending from the radially inner surface of the housing 18.

In order to guarantee a high efficiency of the turbo machine, the air flow not passing through the impellers 14 of the individual stages must be limited, i.e. leaks between the radially outer ends of the blades 16 and the ring 17 made of abradable material must be limited. To do this, the clearance must be checked at this interface, as this clearance is highly dependent on the temperature of housing 18, and in particular on the areas of said housing 18 containing the hooks or flanges 20 supporting ring 17.

The primary air flow from combustion chamber 5 is very hot and heats the downstream parts, such as the fixed and mobile parts of the turbine 6, 7.

In order to control the above-mentioned play and to avoid any premature degradation of the various fixed and movable parts of the turbine, it is necessary to provide effective cooling means that can be easily integrated into the environment of the turbomachine.

The patent application FR 3 021 700, on behalf of the Applicant, discloses a cooling device 21 of a low-pressure turbine 7 housing 18, visible in FIG. 3, with collector boxes 22, each collector box 22 forming an axially extending channel.

The device 21 also includes tubes 23 extending circumferentially on either side of the collector boxes 22. These tubes 23, also called ramps, are formed by curved pipes of circular cross-section, each tube 23 extending circumferentially around the housing, for example at an angle of about 90°.

Each tube 23 has an air inlet opening into the channel of the corresponding collector box 22 and a closed distal end. Each tube 23 also has a cylindrical wall with air ejection openings facing housing 18, so that cooling air can enter the manifolds 22 and then the tubes 23 before opening through the openings facing housing 18 to cool it. This is known as impact cooling because the air impacts the housing 18.

All tubes 23 are held together on the housing 18 by means of fixing means 24, at different points on the circumference of the housing 18. The fixing means 24 each have a radially inner and a radially outer plate. The plates are fixed to each other and to the housing 18 by means of screws. In particular, the radially inner plate is held in contact with the radially outer surface of the housing 18.

Such a structure needs to be improved to more effectively support the axial expansion of the housing. Indeed, during operation, the heating of the housing causes axial and circumferential expansion of the housing. All the above-mentioned cooling device tubes are mounted together on the housing. In addition, the axial expansion of the sheets is not identical to the axial expansion of the housing, which can generate significant mechanical stresses and premature wear between the sheet metal fixing means and the housing, at the level of the tubes and/or at the level of the tube fixing zones on the collector boxes.

SUMMARY OF THE INVENTION

One of the aims of the invention is to provide a simple, effective and economical solution to these problems.

For this purpose, it offers a cooling device extending circumferentially around a turbo machine housing, such as a turbine housing, having at least a first and a second cooling module, each cooling module comprising a tube holder having at least one sheet, preferably a radially inner sheet and a radially outer sheet fixed one to the other, the tube holder defining only two axially spaced apart seats, each housing receiving a tube and a sleeve mounted around each tube, each tube extending circumferentially around the housing, each cooling module having first fixing means capable of fixing its tube support with respect to the housing, the first fixing means comprising a spacer having a radially inner end intended to come to rest against the housing and a radially outer end coming to rest on the sheet metal or sheets of the tube support, each cooling module comprising second fixing means axially spaced from the first fixing means, the second fixing means being capable of holding the tube support of the cooling module fixedly in relation to the housing, the first and second fixing means of each cooling module being located at the axial ends of the tube holder, the first cooling module being offset with respect to the second cooling module.

This support can be direct or indirect. In the case where the supports are indirect, they are carried out through an additional element.

The axial and radial terms are defined in relation to the axis around which the tube extends circumferentially, which can be generally merged with the axis of the housing.

In this way, the spacer is able to maintain the radial distance between the sheets and the housing at a given value, and therefore also the radial distance between the tubes mounted in the sheet metal housings and the housing. This distance is also called the air gap. The distance between the tubes and the housing can thus be controlled regardless of the expansion of the housing, so that the cooling of the housing is also controlled. In addition, any contact of the tubes with the housing and therefore any premature wear of the tubes is avoided.

In particular, the planned arrangement of the spacers also makes it possible to limit heat exchanges between the housing and the tubes, in particular to maintain a low temperature of the cooling air.

The distance between the tubes and the housing is for example between 2 and 10 mm.

Each module has two tubes.

The axial and circumferential offset between the modules also prevents heat exchange between the modules.

The spacer can be considered as non-deformable, especially in the radial direction. For example, it is not made of sheet metal, which is flexible or deformable. If at least one of the above-mentioned supports of the spacer on the radially inner sheet and on the housing is indirect, i. e. is made via an additional element, then the additional element is also non-deformable.

The circumferential sliding of the tubes in the bushings compensates for the circumferential expansion of the housing.

In addition, the fact that the tubes are grouped into different modules fixed independently of each other on the housing makes it possible to adapt to the axial expansion effects of the housing while maintaining the axial positions of the tubes in relation to the areas of the housing to be cooled, in particular in relation to the radially inner flanges or hooks of the housing used for example for mounting the distributors or the abradable rings of the turbine.

As is known per se, the tubes may have air ejection openings directed towards the housing, i.e. opening radially inward. The orifices can be evenly distributed over the entire circumference and can form one or more rows of orifices per tube.

The first fixing means may include a screw or rivet extending into the spacer, the spacer being tubular and surrounding said screw or rivet.

The first fixing means and the second fixing means may be located axially on either side of all the tubes of the same module. Fixing means can also be provided axially between the tubes of the same module.

The second fixing means may include a spacer with a radially inner end intended to rest against the housing and a radially outer end intended to rest on the one or on one of the sheets of the tube support.

The spacers of the first and second fixing means can be located at the axial ends of the tube holder.

The second fixing means may include a connecting plate fixed to the tube support of the cooling module and intended to be fixed to a radial annular flange of the housing.

The second fixing means are then without spacers. Indeed, the connecting plate does not form a spacer per se because, unlike the spacer, it cannot be considered non-deformable or substantially non-deformable, particularly in the radial direction.

The first and/or second fixing means may comprise at least one screw or rivet engaged in an elongated hole in the sheets, the radially outer end of the screw or rivet comprising a shoulder, a resilient member being mounted between said shoulder and the tube support.

The shoulder can be formed by an enlarged screw or rivet head, or by a nut screwed onto a screw thread.

The elongated hole allows the fixing means to be moved relative to the sheets in the event of axial expansion of the housing. The elastic element allows the radially outer sheet to be held against the radially inner sheet, so that the sleeves are held in the corresponding sheet housings. The radially inner and outer sheets are not welded together.

The elastic member can be a spring, such as a helical compression spring. The spring element can also be a spring washer, such as a Belleville washer.

The first and/or second fixing means may include a screw or rivet engaged in holes in the tube holder of the cooling module, one of the screws or rivets being engaged in an elongated hole, the other screw or rivet being engaged without play in a circular hole.

The term "backlash-free" refers to the absence of an oblong shape of the hole. Of course, there may be a small mounting clearance between the screw or rivet and the holes in the module sheets.

The first and/or second fixing means may include a screw or rivet engaged in elongated holes in the cooling module tube holder.

This makes it possible to compensate for significant expansion of the housing and in particular to avoid the appearance of cracks or fissures in the connection between the tubes and the corresponding collector box.

The radially inner and/or radially outer sheet of the tube holder can form housings and the tube holder comprises at least one stiffener extending axially between the sheet metal housings.

Each sheet can have a stiffener. Each stiffener can be formed by a radially and axially extending sheet welded to the corresponding radially inner or outer sheet.

At least one sleeve can extend circumferentially on either side of a housing of the tube holder of a cooling module.

In this way, any contact of the tubes with the sheets is avoided, in order to prevent any premature wear of the tubes, especially when the assembly is subjected to vibrations.

The sleeve can be fixed to the sheets by matting. The socket can be made of silica.

The first cooling module can be axially and circumferentially off-set from the second cooling module.

The invention also concerns an assembly comprising an annular housing of a turbo machine, for example an annular housing of a turbine, characterized in that it can comprise a cooling device of the aforementioned type, fixed to the said housing and surrounding the said housing, the fixing means ensuring the fixing of the sheets to the housing, the radially inner end of the spacer of the said first and/or second fixing means coming into contact with the radially outer surface of the housing.

The housing can have cylindrical and truncated conical portions.

The invention also concerns a turbine assembly, comprising an annular housing and a cooling device of the aforementioned type.

The invention also concerns a double-flow turbojet engine, with a fan downstream of it:

a primary vein in which a primary flow flows, said primary vein passing through, in particular, in the direction of flow of the primary flow, a compressor, a combustion chamber and a turbine comprising a turbine housing, a secondary vein in which a secondary flow flows distinct from the primary flow, characterized in that the turbine has a cooling device of the aforementioned type, located radially outside the turbine housing.

The invention will be better understood and other details, characteristics and advantages of the invention will appear when reading the following description, which is given as a non-limiting example, with reference to the attached drawings.

BRIEF DESCRIPTION OF THE FIGURES

FIG. 5 is a top view of a part of the cooling device according to the invention, FIG. 6 is an axial cross-sectional view of a part of the cooling system according to the invention, FIGS. 7 and 8 are detailed and axial cross-sectional views of a part of the cooling system, illustrating two variants of the invention.

DETAILED DESCRIPTION

Figure 1:
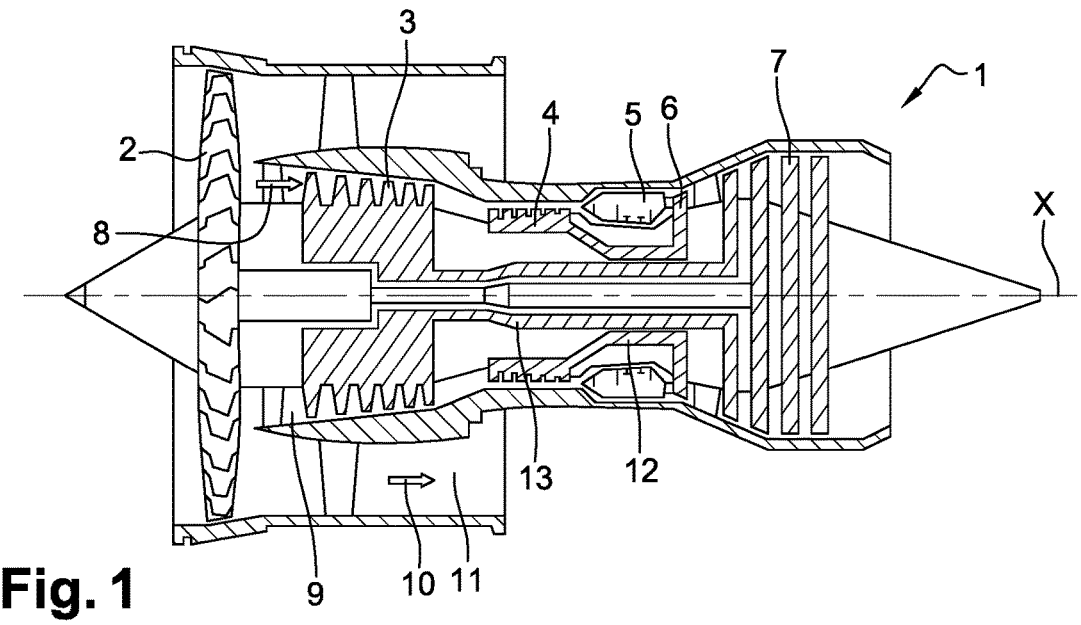
FIG. 1 is an axial cross-sectional view of a double-flow turbojet engine of the prior art.
Figure 2:
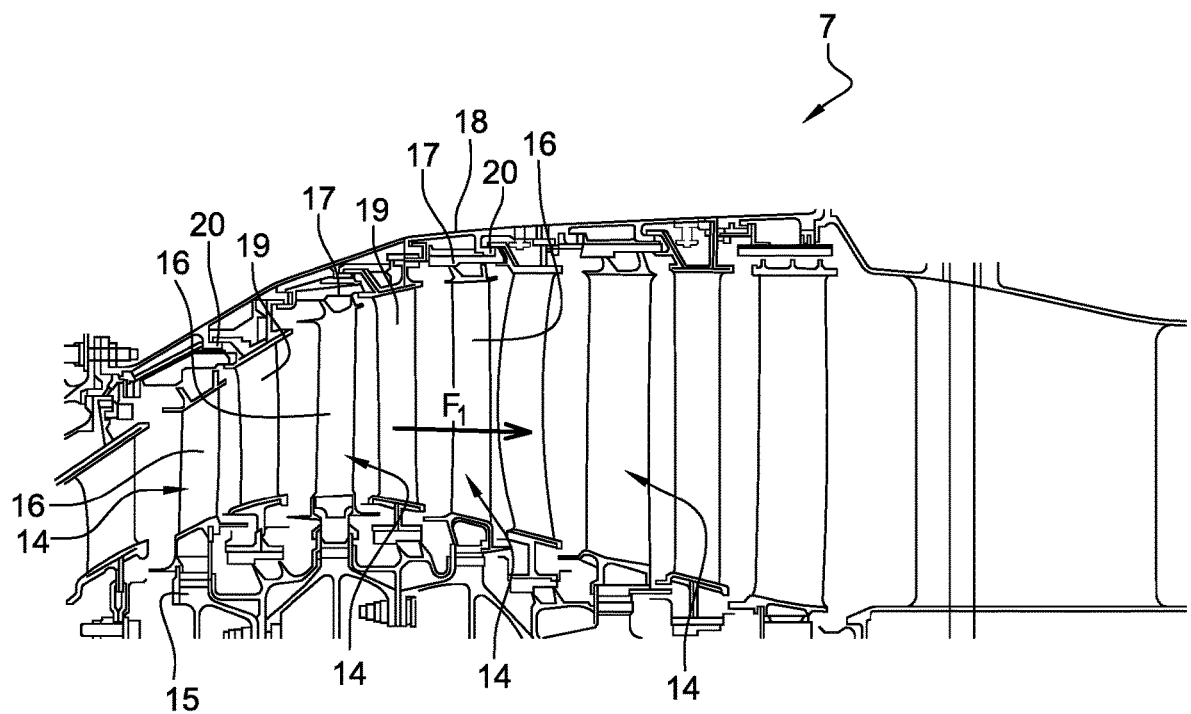
FIG. 2 is an axial cross-sectional view of a part of the turbojet engine of the prior art, illustrating in particular the low-pressure turbine.
Figure 3:
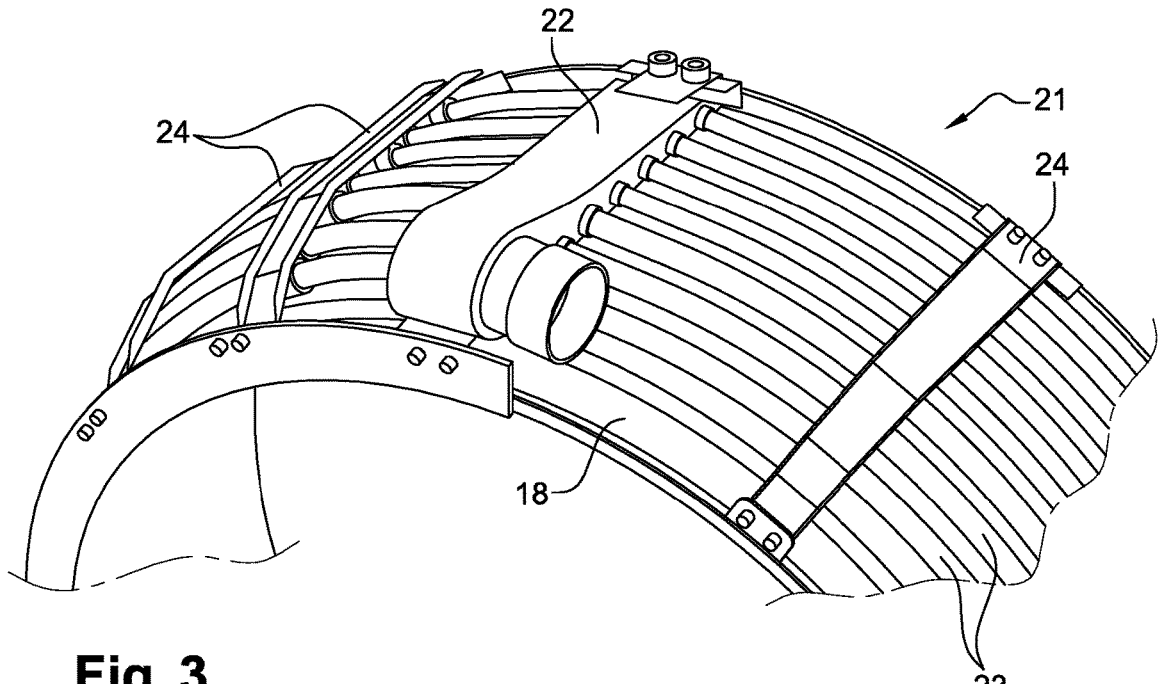
FIG. 3 is a perspective view of a cooling device of the prior art.
Figure 4:
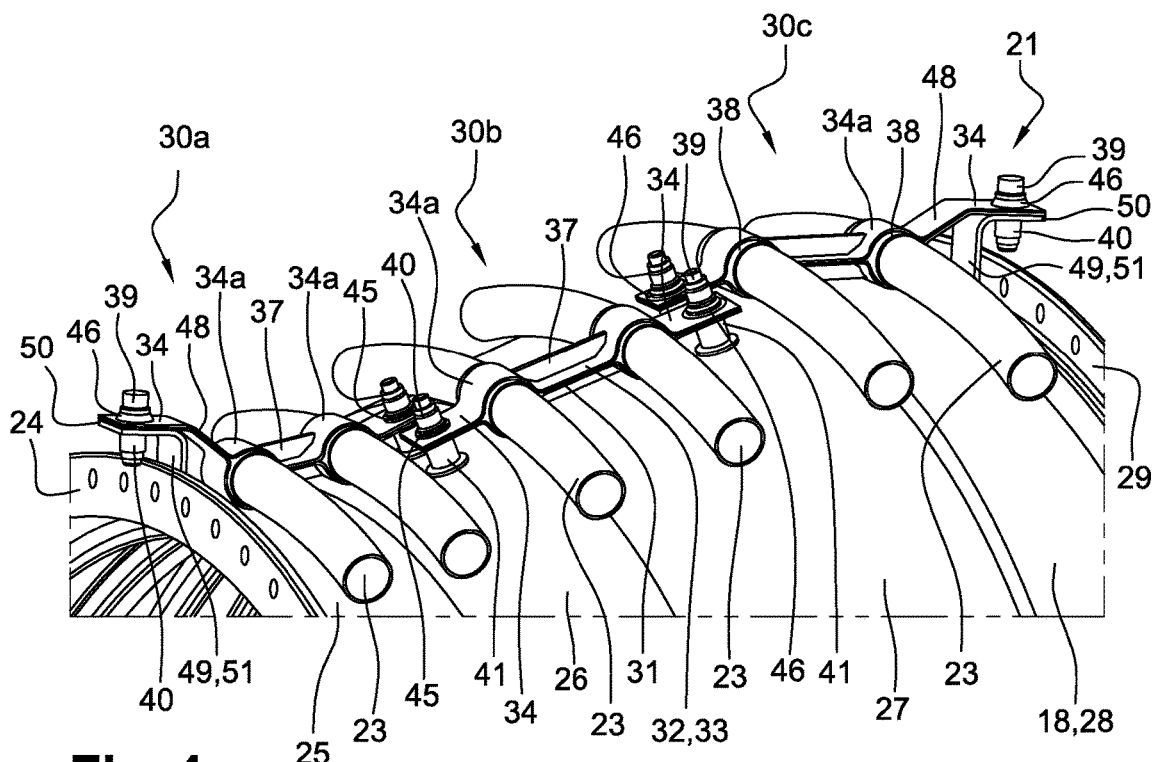
FIG. 4 is a perspective view of a part of a cooling device according to an embodiment of the invention.

FIGS. 4 to 6 illustrate a part of a cooling system 21 mounted on a low-pressure turbine 7 housing 18 of an aircraft turbomachine 1, according to an embodiment of the invention.

Housing 18 is annular in shape and has, from upstream to downstream, an upstream radial annular flange 24, a first cylindrical part 25, a first frustoconical part 26, a second frustoconical part 27, a second cylindrical part 28 and a downstream radial annular flange 29. Flanges 24, 29 allow the connection of the turbine housing 18 to other housings of the turbomachine 1.

The cooling system 21 consists of three modules 30a, 30b, 30c, respectively an upstream module 30a, a middle module 30b and a downstream module 30c. The upstream, downstream, axial and radial terms are defined below in relation to the axis of the housing 18.

Each module 30a, 30b, 30c has a radially inner sheet 31 and a radially outer sheet 32. Each sheet 31, 32 has at least one axially flat central part 33, two flat axial end parts 34, and two housing portions 34a of semicylindrical shape for example, provided between the central part 33 and the end parts 34. The flat parts 33, 34 extend in a plane which is tangent to the circumferential direction. The housing portions 34a are axially spaced from each other. The housing portions 34a of the radially inner sheet 31 are located axially opposite the housing portions 34a of the radially outer sheet 32, so as to form two axially offset, rounded or cylindrical housings for each module 30a, 30b, 30c.

Each sheet 31, 32 has a hole 35, 36 (FIG. 5) at each end portion 34 of sheet 31, 32. Holes 35, 36 of the radially inner sheet 31 are located axially opposite holes 35, 36 of the radially outer sheet 32.

Each sheet 31, 32 has a stiffener 37 extending axially between the above-mentioned housing portions 34a. In particular, the radially inner sheet 31 has a stiffener 37 in the form of a sheet extending radially inward from the middle 33 of the corresponding sheet 31. The radially outer sheet 32 has a stiffener 37 in the form of a sheet extending radially outwards from the middle 33 of the corresponding sheet 32.

The sheets 31, 32 can have a thickness between 0.5 and 5 mm.

One sleeve 38 is mounted in each slot of each module 30a, 30b, 30c. Each sleeve 38 extends circumferentially beyond sheets 31, 32, on either side of said sheets 31, 32. Sleeves 38 can be made of silica. Each sleeve 38 is surrounded by the housing portions 34a and is fixed to at least one of the sheets by matting, i. e. by local deformation of the material. The sheets 31, 32 thus form flanges at the level of the said housing portions 34a, surrounding the sleeves 38 and the tubes 23.

Tubes 23 are mounted slidingly into the sleeves 38. Tubes 23 extend circumferentially and are parallel to each other.

As is known per se, tubes 23 are formed by curved pipes of circular cross-section, each tube 23 extending for example at an angle of about 90°.

Each tube 23 has an air inlet opening into the channel of a corresponding collector box 22 and a closed distal end. Each tube 23 also has a cylindrical wall with air ejection openings facing housing 18, so that cooling air can enter the manifolds 22 and then the tubes 23 before opening through the openings facing housing 18 to cool it. In particular, tubes 23 are located axially opposite the housing areas with flanges or hooks 20 for mounting valves 19 or abradable rings 17.

First, the median module 30b will be described below.

The sheets 31, 32 of the median module 30b are fixed to the housing 18 by upstream and downstream fixing means, each comprising a fixing screw 39, a nut 40 and a tubular spacer 41.

Each screw 39 has an enlarged head 42 (FIG. 7) intended to be bear on a radially inner surface 43 of the housing 18, an enlarged holding part 44 and a radially outer threaded end 45, cooperating with the nut 40 bearing on the radially outer sheet 32, via a washer 45, 46. Each screw 39 is engaged in the corresponding holes 35, 36 of the radially inner sheet 31 and the radially outer sheet 32.

Each spacer 41 surrounds part of the screw 39 and is located between the outer surface of the housing 18 and the radially inner sheet 31. Thus, as is best seen in FIG. 7, the radially inner end of the spacer 41 bears on the outer surface of the housing 18 (here on the frustoconical part 27 of the housing 18) and the radially outer end of the spacer 41 bears on the radially inner sheet 31. For example, spacers 41 are made of steel.

The widened areas 44 are mounted slightly forcefully in the spacers 41 in order to keep the screws 39 in position with respect to the housing 18 when mounting the cooling device 21.

Alternatively, as shown in FIG. 8, the enlarged holding part 44 can be replaced by an elastic ring 47 engaged in a groove of the screw 39 and elastically supported on the inner surface of the sleeve 41 so as to provide the holding function for the screw 39 with respect to the housing 18.

A flat washer 45 is mounted between the nut 40 of the upstream fixing means and the radially outer sheet 32. The holes 35 of the sheets 31, 32 allowing the passage of the screw 39 of the upstream fixing means are circular. Screw 39 is mounted with little or no play in said holes 35. Of course, a mounting set can be provided.

A resiliently deformable washer 46, such as a Belleville washer, is inserted between the nut 40 of the downstream fastening means and the radially outer sheet 32. The holes 36 of the sheets 31, 32 allowing the passage of the screw 39 of the downstream fixing means are oblong in shape, in order to compensate for any axial expansion of the housing 18. The resiliently deformable washer 46 allows the radially outer sheet 32 to be held on the radially inner sheet 31, so as to clamp and hold the sleeves 38 and tubes 23 between the sheets 31, 32, while allowing the corresponding screw 39 and nut 40 to move axially relative to the radially inner and outer sheets 31, 32.

The upstream module 30a will now be described. This differs from the median module 30b in that the sheets 31, 32 have an oblique part 48 between the upstream end portions 34 and the upstream housing portions 34a. The holes 35 of the downstream end portions 34 are circular and the holes 36 of the upstream end portions 34 are oblong.

The upstream end parts 34 of the sheets 31, 32 are fixed to the upstream flange 24 of the housing 18 by means of an angled connecting plate 49. The connecting plate 49 comprises an axially extending part 50, pressed against the upstream end part 34 of the radially inner plate 31, and a radially extending part 51, fixed to the upstream flange 24 by any appropriate means.

The upstream fastening means do not have a spacer 41. In particular, the upstream fixing means comprise a screw 39 engaged in the corresponding oblong holes 36 and a nut 40 allowing the radially inner and outer plates 31, 32 and the axial part 50 of the connecting plate 49 to be fixed together. Such an assembly allows an axial displacement of the connecting plate 49 with respect to the radially inner and outer plates 31, 32 of the upstream module 30a.

The downstream fixing means comprise a spacer 41 located between the radially inner sheet 31 and the housing 18 and a flat washer 45 located between the corresponding nut 40 and the radially outer sheet 32. The downstream fastening means of the upstream module 30a are located circumferentially offset at a common axial position from the upstream fastening means of the middle module 30b. There is therefore a circumferential offset, preferably slight, between the sheets 31, 32 and the fastening means of the upstream module 30a with respect to the sheets 31, 32 and the fastening means of the middle module 30b.

The downstream module 30c will now be described. This differs from the median module 30b in that the sheets 31, 32 have an oblique part 48 between the downstream end portions 34 and the downstream housing portions 34a. The holes 36 of the downstream end portions 34 are oblong and the holes 36 of the upstream end portions 34 are oblong.

The downstream end parts 34 of the sheets 31, 32 are fixed to the downstream flange 29 of the housing 18 by means of an angled connecting plate 49. The connecting plate 49 comprises an axially extending part 50, pressed against the downstream end part 34 of the radially inner plate 31, and a radially extending part 51, fixed to the downstream flange 29 by any appropriate means.

The downstream fastening means do not have a spacer 41. In particular, the downstream fixing means comprise a screw 39 engaged in the corresponding oblong holes 36 and a nut 40 allowing the radially inner and outer plates 31, 32 and the axial part 50 of the connecting plate 49 to be fixed together. Such an assembly allows an axial displacement of the connecting plate 49 with respect to the radially inner and outer plates 31, 32 of the downstream module 30c.

The upstream fixing means comprise a spacer 41 located between the radially inner sheet 31 and the housing 18 and an elastically deformable washer 46 located between the corresponding nut 40 and the radially outer sheet 32, so as to allow an axial displacement between the corresponding screw 39 and the sheets 31, 32 of the downstream module 30c. The upstream fastening means of the downstream module 30c are located circumferentially offset at a common axial position from the downstream fastening means of the middle module 30b. There is therefore a circumferential offset between the sheets 31, 32 and the fastening means of the downstream module 30c with respect to the sheets 31, 32 and the fastening means of the middle module 30b. Such an offset makes it easier to place the tube supports in relation to each other around the housing.

The invention claimed is:

1. A cooling device (21) extending circumferentially around a housing (18) of a turbomachine (1), comprising at least a first and a second cooling module (30a, 30b, 30c), each cooling module (30a, 30b, 30c) comprising a tube holder (31, 32) having a radially inner sheet (31) and a radially outer sheet (32) fixed with respect to each other, the tube holder (31, 32) defining only two axially spaced tube housings (34a), each tube housing (34a) receiving a tube (23) and a sleeve (38) mounted around each tube (23), each tube (23) extending circumferentially around the housing (18), each cooling module (30a, 30b, 30c) having a first fastener holding its tube holder (31, 32) to the housing (18), the first fastener comprising a first spacer (41) having a radially inner end for bearing against the housing (18) and a radially outer end for bearing against the radially inner sheet (31) of the tube holder (31, 32), each cooling module (30a, 30b, 30c) having a second fastener axially spaced from the first fastener, the second fastener being adapted to securely hold the tube holder (31, 32) of the cooling module (30a, 30b, 30c) to the housing (18), the first fastener and second fastener of each cooling module (30a, 30b, 30c) being located at axial ends of the tube holder (31, 32), the first cooling module (30a) being circumferentially offset from the second cooling module (30b) wherein the first fastener of the first cooling module is circumferentially offset at a common axial position from the second fastener of the second cooling module.

2. The cooling device (21) according to claim 1, characterized in that at least one the first fastener and the second fastener comprises a screw (39) or a rivet extending into the spacer (41), the spacer (41) being tubular and surrounding said screw (39) or said rivet.

3. The cooling device (21) according to claim 1, characterized in that the second fastener comprises a second spacer (41) having a second radially inner end for bearing against the housing (18) and a second radially outer end for bearing against the radially inner sheet (31) of the tube holder (31, 32).

4. The cooling device (21) according to claim 1, characterized in that the second fastener comprises a connecting plate (49) fixed to the tube holder (31, 32) for coupling with an annular radial flange (24, 29) of the housing (18).

5. The cooling device (21) according to claim 1, characterized in that at least one of the first fastener and the second fastener comprises at least one screw (39) or rivet engaged in an oblong hole (36) through the radially inner sheet (31) and the radially outer sheet (32), a radially outer end of the screw (29) or the rivet comprising a shoulder (40), a resilient member (46) being mounted between said shoulder (40) and the tube holder (31, 32).

6. The cooling device (21) according to claim 1, characterized in that the first fastener and the second fastener each comprise a screw (39) or a rivet engaged in holes (35) in the tube holder (31, 32) of the cooling module (30a, 30b), one of the screws (39) or one of the rivets being engaged in an oblong hole (36), the other screw (39) or the other rivet being engaged without play in a circular hole (35).

7. The cooling device (21) according to claim 1, characterized in that the first fastener and the second fastener each comprise a screw (39) or a rivet engaged in oblong holes (36) in the tube holder (31, 32) of the cooling module (30c).

8. The cooling device (21) according to claim 2, characterized in that one of the screw or the rivet of each of the first fastener and the second fastener engage in an oblong hole (36) in the tube holder (31, 32) of the cooling module (30c).

9. The cooling device (21) according to claim 3, characterized in that one of the first fastener and the second fastener comprises a screw (39) or a rivet that engages in an oblong hole (36) in the tube holder (31, 32) of the cooling module (30c).

10. The cooling device (21) according to claim 5, characterized in that the other of the first fastener and the second fastener comprise a screw (39) or a rivet engaged in oblong holes (36) in the tube holder (31, 32) of the cooling module (30c).

11. The cooling device (21) according to claim 1, characterized in that the radially inner sheet (31) and/or the radially outer sheet (32) of the tube holder (31, 32) form the tube housings (34a) and the tube holder (31, 32) comprises at least one stiffener (37) extending axially between the tube housings (34a).

12. The cooling device (21) according to claim 2, characterized in that the radially inner sheet (31) and the radially outer sheet (32) of the tube holder (31, 32) form the tube housings (34a) and the tube holder (31, 32) comprises at least one stiffener (37) extending axially between the tube housings (34a).

13. The cooling device (21) according to claim 3, characterized in that the radially inner sheet (31) and/or the radially outer sheet (32) of the tube holder (31, 32) form the tube housings (34a) and the tube holder (31, 32) comprises at least one stiffener (37) extending axially between the tube housings (34a).

14. The cooling device (21) according to claim 5, characterized in that the radially inner sheet (31) and/or the radially outer sheet (32) of the tube holder (31, 32) form the tube housings (34a) and the tube holder (31, 32) comprises at least one stiffener (37) extending axially between the tube housings (34a).

15. The cooling device (21) according to claim 1, characterized in that at least one of the sleeves (38) extends circumferentially on either side of the tube housing (34a) of the tube holder (31, 32) of one of the cooling modules (30a, 30b, 30c).

16. The cooling device (21) according to claim 2, characterized in that at least one of the sleeves (38) extends circumferentially on either side of the tube housing (34a) of the tube holder (31, 32) of one of the cooling modules (30a, 30b, 30c).

17. The cooling device (21) according to claim 3, characterized in that at least one of the sleeves (38) extends circumferentially on either side of the tube housing (34a) of the tube holder (31, 32) of one of the cooling modules (30a, 30b, 30c).

18. The cooling device (21) according to claim 5, characterized in that at least one sleeve (38) can extend circumferentially on either side of the tube housing (34a) of the tube holder (31, 32) of one of the cooling module (30a, 30b, 30c).

19. The cooling device (21) according to claim 1, characterized in that the first cooling module (30a) is axially and circumferentially off-set from the second cooling module (30b).

20. An assembly comprising an annular housing (18) of a turbo machine (1), characterized in that-i4 the turbo machine includes a cooling device (21) comprising: at least a first and a second cooling module (30a, 30b, 30c), each cooling module (30a, 30b, 30c) comprising a tube holder (31, 32) having a radially inner sheet (31) and a radially outer sheet (32) fixed with respect to each other, the tube holder (31, 32) defining only two axially spaced tube housings (34a), each tube housing (34a) receiving a tube (23) and a sleeve (38) mounted around each tube (23), each tube (23) extending circumferentially around the housing (18), each cooling module (30a, 30b, 30c) having a first fastener holding its tube holder (31, 32) to the housing (18), the first fastener comprising a first spacer (41) having a radially inner end for bearing against the housing (18) and a radially outer end for bearing against the radially inner sheet (31) of the tube holder (31, 32), each cooling module (30a, 30b, 30c) having a second fastener axially spaced from the first fastener, the second fastener being adapted to securely hold the tube holder (31, 32) of the cooling module (30a, 30b, 30c) to the housing (18), the first fastener and the second fastener of each cooling module (30a, 30b, 30c) being located at axial ends of the tube holder (31, 32), the first cooling module (30a) being circumferentially offset from the second cooling module (30b) wherein the first fastener of the first cooling module is circumferentially offset at a common axial position from the second fastener of the second cooling module; said cooling device (21) being fixed to said housing (18) and surrounding said housing (18), the first fastener and the second fastener fixing the radially inner sheet (31) and the radially outer sheet (32) to the housing (18), the radially inner end of the spacer (41) of said first fastener and/or the second fastener bearing against the radially outer surface of the housing (18).

* * * * *